Sept. 9, 1969  W. D. PIERSON, JR  3,465,914
CONCEALED TRIM CLAMP FOR ELECTRICAL PANELBOARDS
AND TELEPHONE CABINETS
Filed June 24, 1968

United States Patent Office

3,465,914
Patented Sept. 9, 1969

3,465,914
CONCEALED TRIM CLAMP FOR ELECTRICAL
PANELBOARDS AND TELEPHONE CABINETS
William D. Pierson, Jr., deceased, late of West Hartford, Conn., by Rilla May Curtis Pierson, administratrix, West Hartford, Conn., assignor to General Electric Company, a corporation of New York
Filed June 24, 1968, Ser. No. 740,447
Int. Cl. B65d 51/00; H05k 5/03; E05c 3/00
U.S. Cl. 220—24.3                                       7 Claims

ABSTRACT OF THE DISCLOSURE

A concealed trim clamp for electrical panelboards and telephone cabinets including a clamp member pivotally mounted on a bracket on the inside of a "trim" or box front cover and having a nut pivoted thereon which receives the end of an elongated screw, the head of the screw being accessible for operation only when the door in the "trim" is open.

BACKGROUND OF THE INVENTION

Field of the invention

This invention relates to electrical and telephone equipment enclosures, and more particularly to an improvement in electrical circuit breaker panelboards and telephone cabinets of the type comprising a box for housing the electrical or telephone components, the box often being mounted in an opening in a supporting surface such as a wall, and a "trim" or box front cover detachably fastened to the open side of the box.

Description of the prior art

In accordance with the prior art, a variety of different types of fastening means have been utilized for the purpose of attaching a "trim" or box front cover to a box or enclosure. For example, with small enclosures of the type commonly mounted on the surface of a wall, it is customary to attach the trim to the box by means of simple screw fasteners inserted through holes in the trim into tapped holes in brackets or flanges carried by the box. Although this particular means of fastening the trim to the box will generally suffice when used with small enclosures mounted on the front surface of a wall, it presents problems when used with larger box enclosures and/or when different mounting conditions are encountered. Thus, as the size of the box enclosure increases, there is a corresponding increase in the size and weight of the trim, and it is difficult to hold heavy trims vertically in place during the process of installation while the requisite number of simple screw fasteners are being inserted. Another situation often encountered in practice, in which the use of simple screw fasteners has proven to be unsatisfactory is where the box has been mounted too far into the opening provided therefor in a wall. Under these circumstances it is very difficult to get the screw fasteners to engage the tapped holes in the flanges of the box enclosure. A third situation which frequently presents itself in practice is where the box is inadvertently set "out of plumb" in the wall opening, that is with the sides not truly vertical. The trim will, of course, likewise be out of plumb if simple screw fasteners are used in conjunction with pre-positioned tapped holes to attach the trim to the box, and this of course is something which both from an appearance and a safety standpoint one would like to avoid if possible.

One approach which has been taken by the prior art in an attempt to eliminate some of the aforesaid problems encountered when using simple screw fasteners to attach a trim to a box involves the use of adjustable hooks. These hooks which engage the flanges of the box are operated by means of screws through the trim. A disadvantage of using this particular type of trim attaching means is that to install the trim the hooks must be backed off sufficiently to clear the flanges of the box. As the hooks are tightened, they may catch the electrical wiring within the enclosure, inhibiting further operation of the hooks and damaging the wires.

In an improved version of the adjustable hook idea, the hooks are made rotatable. This reduces the possibility of catching wires with the hooks but requires the addition of some means to indicate from the outside of the trim the position of the hook with reference to the box flange. As yet, no entirely satisfactory means has been provided to overcome this latter problem.

Added to the difficulties noted above which have been encountered in employing prior art forms of trim fasteners is the fact that the operating means for the fasteners such as screws, etc., located on the trim detract from the outer appearance of the box. For even though a locked door may be provided in the trim giving access to the interior of the box, unauthorized persons may loosen the clamp screws, and remove the trim, thereby gaining access to the hazardous equipment or devices housed within the box enclosure. It is particularly desirable to provide some means to prevent such unauthorized access especially in places such as prisons and schools.

OBJECTS OF THE INVENTION

It is an object of the present invention to provide an equipment enclosure of the type referred to which includes trim clamps which are visible and accessible only when the door in the trim is open.

It is another object of the present invention to provide an equipment enclosure of the type referred to which includes concealed trim clamps which do not engage fixed fastening positions such as tapped holes in the flanges of the enclosure but rather are capable of engaging the flanges of the enclosure at any point.

A still further object of the present invention is to provide an equipment enclosure of the type referred to which includes concealed trim clamps which need only be backed off to a limited extent to engage the flanges of the enclosure whereby there is a very little likelihood that the clamps will catch any of the wires, etc. within the enclosure.

Yet another object of the present invention is to provide an equipment enclosure of the type referred to which includes concealed trim clamps, each having an operating means which provides a mechanical advantage as the clamp is tightened thus assuring that the trim is securely attached to the enclosure.

SUMMARY OF THE INVENTION

In accordance with the present invention there is provided an electrical equipment enclosure including a housing having a back wall and side walls, and a separate detachtably mounted front closure member or trim having a door therein. A plurality of clamping means are provided each including a pair of right angle brackets mounted on the interior surface of the front closure member. A clamp is pivotally mounted on one bracket of each pair thereof, and is caused to rotate about its pivot points by the rotation of a screw which passes through a hole provided therefor in the other bracket of each pair thereof. To mount the front closure member or trim on the housing, the respective screw associated with each of said clamps is rotated until the free end of the corresponding clamp is drawn into engagement with a flange provided on at least some of said side walls. This rotation of the screw is continued until the flange is captured between the free end of the clamp and the interior surfaces of the front closure member. With the front closure member or trim so mounted, all of the respective elements of each of the clamping means are concealed from view behind the front closure member and access thereto can be obtained only through the door provided in the front closure member.

The invention will be more fully understood from the following detailed description and its scope will be pointed out in the appended claims.

DESCRIPTION OF A PREFERRED EMBODIMENT

Figure 1:
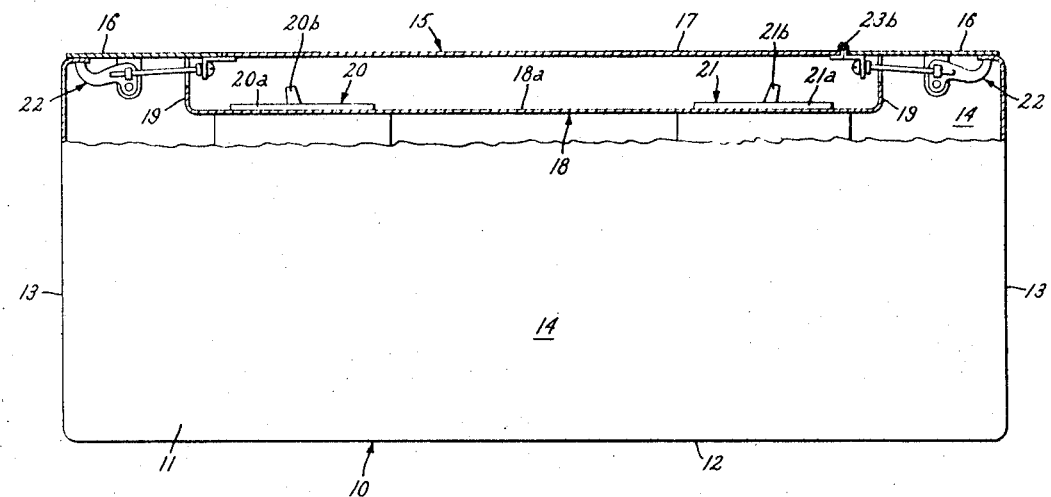
FIGURE 1 is an elevation view of an electrical equipment enclosure in accordance with the present invention illustrated with a portion of one side of the side walls thereof broken away to show the clamping means mounted at the interior of the enclosure.

Referring to FIGURE 1, the invention is shown as incorporated in an electrical circuit breaker panelboard enclosure 10. The enclosure 10 includes a housing 11 comprising a back wall 12, pairs of opposed side walls 13 and 14, respectively, and a front closure 15, comprising a front cover or trim panel 16 having an openable door 17.

Supported within the interior of the housing 11 is an inner cover plate 18 which has a base portion 18a and upstanding flange portions 19. The base portion 18a is provided in a manner wel known in the art with openings or knockouts (not shown) adapted to receive raised portions 20a and 21a of the circuit breakers 20 and 21, respectively, so as to render the respective circuit breaker operating handles 20b and 21b accessible for manual operation when the door 17 of the trim panel 16 is opened. The inner cover plate 18 may be supported within the housing 11 in any suitable manner such as for example on brackets (not shown) in the manner more fully described and illustrated in Patent 2,946,928, which is assigned to the same assignee as the present invention.

The trim panel 16 is detachably secured to the housing 11 by means of a plurality of clamping means 22 which in the preferred embodiment of the invention are four in number with two of the clamping means 22 being positioned in spaced apart relation adjacent each of the opposed side walls 13. Since all of the clamping means 22 are substantially identical, the construction of only one of them will be described.

Figure 2:
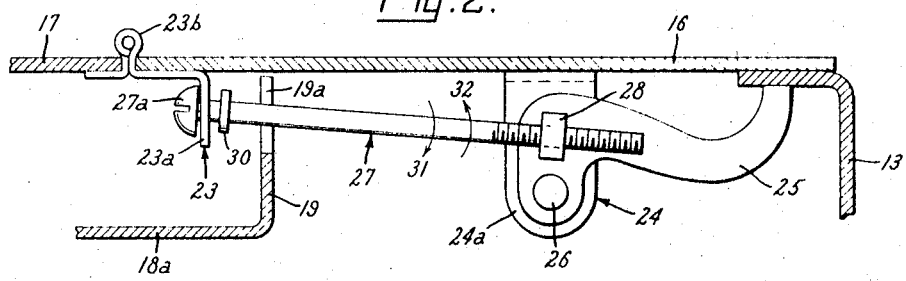
FIGURE 2 is a side view on an enlarged scale of one of the clamping means of FIGURE 1 illustrated with the parts thereof in the clamping position.
Figure 3:
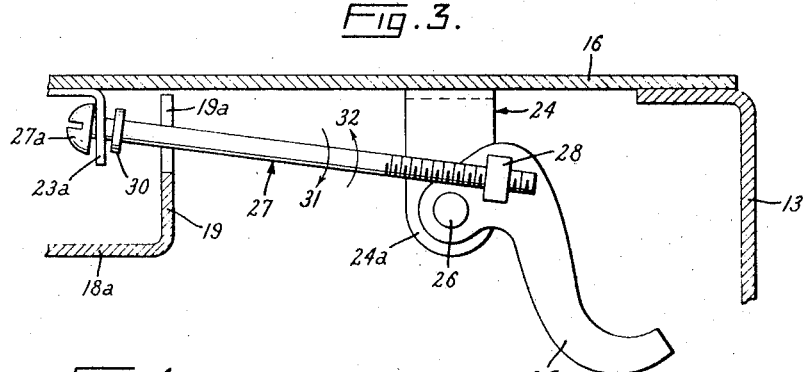
FIGURE 3 is a side view similar to FIGURE 2 with the parts of the clamping means illustrated in the unclamping position.
Figure 4:
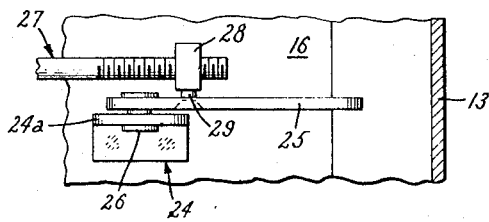
FIGURE 4 is a bottom view on a somewhat enlarged scale of one of the clamping means of FIGURE 1 in accordance with the present invention.

Referring now to FIGURES 2 and 3 of the drawing, the clamping means 22 illustrated therein includes a pair of flat sheet metal right angle brackets 23 and 24 mounted on the inner surface of the trim panel 16 by any suitable means such as by welding, riveting, etc. The upstanding legs 23a and 24a, respectively, of the brackets 23 and 24 are spaced from each other and lie in planes which are perpendicular to each other. A clamp 25 is pivotally mounted on the bracket 24 for rotational movement relative thereto by means of a stud 26 or other equivalent member. The clamp 25 is caused to rotate about its pivot points as a result of the rotation of screw 27 which passes through an opening (not shown) suitably provided therefor in bracket 23. The screw 27 in addition passes through a slot 19a suitably provided for this purpose in the flange 19 of the inner cover panel 18. The screw 27 is threaded into a nut 28 which is supported on the clamp 25 by means of stud 29 such that the nut 28 may rotate relative to the clamp 25.

Rotation of the screw 27 in the direction of arrow 31 causes the screw head 27a to engage the bracket 23, and pulls the nut 28 and therefore the clamp 25, toward the bracket 23. When the screw 27 is rotated in the opposite direction, i.e., the direction of arrow 32, the washer 30 which is positioned on the screw 27 in closed spaced relation to the screw head 27a by means of a friction fit therewith engages the bracket 23, and the nut 28 and therefore the clamp 25 move in a direction away from the bracket 23. It will be noted that the washer 30 must of course be positioned on the screw 27 before the latter is threaded into the nut 28.

To mount the trim panel 16 on the housing 11, the screws 27 of the clamping means 22 are first rotated in the direction of arrow 32 until each of the clamps 25 occupies a position with reference to the inner surface of the trim panel 16 approximately as illustrated in FIGURE 3 of the drawing. The trim panel 16 is then brought into juxtaposed relation with the pairs of opposed side walls 13 and 14, respectively, of the housing 11 and with the screws 27 positioned in the slots 19a provided therefor in the flanges 19 of the inner cover plate 18. With the door 17 in the trim panel 16 open, the screws 27 are each rotated in the direction of arrow 31 until the free end 25a of each of the clamps 25 is drawn into engagement with the flange 13a of the corresponding side wall 13. This rotation of the screws 27 is continued until the respective flange 13a is captured between the free end 25a of the clamp 25 and the inner surface of the trim panel 16. Because of the crank-type arrangement, the mechanical advantage of the screw device is increased as the screw 27 is tightened, thus assuring a snug fit between the trim panel 16 and the housing 11. With the trim panel 16 so mounted, all of the different parts of the clamping means 22 such as the brackets 23 and 24, the clamp 25, the screw 27, and nut 28, etc. lie within the interior of the housing 11 and are concealed from view behind the trim panel 16. Access to one or more of the clamping means 22 can be obtained only through the door 17 provided in the trim panel 16. With the door 17 closed and locked, the trim panel 16 cannot therefore be detached from the housing 11. This thus prevents anyone from gaining unauthorized access to the electrical equipment mounted within the housing 11.

To detach the trim panel 16 from the housing 11, the door 17 is first opened, and then each of the screws 27 is rotated in the direction of arrow 32 to disengage the free ends 25a of the clamps 25 from the flanges 13a. The trim panel 16 is then freely removable.

In accordance with the preferred embodiment of the invention, the bracket 23 depicted in FIGURE 2 of the drawing includes as an integral part thereof the hinge 23b by which the door 17 is mounted on the trim panel 16 for movement relative thereto. It should of course be recognized however that the hinge 23b and the bracket 23 could be formed as separate members and employed as such without departing from the spirit of the invention.

While only one embodiment of the invention has been disclosed, it will be appreciated that many modifications thereof may readily be made by those skilled in the art.

What is claimed as new and desired to be secured by Letters Patent of the United States is:

1. An electrical equipment enclosure comprising:
   (a) a housing having a rear wall, a plurality of side walls and an open front;
   (b) at least some of said side walls each having an inwardly-directed flange portion;
   (c) front closure means for closing said open front of said housing comprising a substantially flat member having a door therein, said flat member having a rear surface and a front surface;
   (d) means mounting said door on said flat member for movement between an open position and a closed position;
   (e) at least one pair of clamping means for detachably attaching said front closure means to said flange portions of said side walls of said housing;

(f) each of said pair of clamping means including support means mounted on said rear surface of said flat member adjacent said door therein;

(g) a clamping member mounted on each of said support means for movement between a clamping position wherein said clamping member is in engagement with said flange portion of one of said side walls and an unclamping position wherein said clamping member is out of engagement with said flange portion;

(h) operating means supported on said support means for moving said clamping member between said clamping and unclamping positions;

(i) said front closure means concealing said pair of clamping means and their respective operating means from view when said front closure means is attached to said flange portions of said side walls of said housing; and (j) said door providing access to said pair of clamping means and their respective operating means only when said door is in said open position.

2. An electrical equipment enclosure as set forth in claim 1 wherein:

(a) said support means comprises a pair of spaced apart right angle brackets each having a leg portion extending rearwardly from the rear face of said flat member;

(b) each said clamping member is mounted on said leg portion of one of said pair of right angle brackets; and (c) said operating means comprises a screw supported on said leg portion of the other of said pair of right angle brackets.

3. An electrical equipment enclosure comprising:

(a) a housing having a rear wall, a plurality of side walls, and an open front;

(b) at least some of said side walls each having an inwardly directed flange portion;

(c) front closure means for closing said open front wall of said housing comprising a substantially flat member having a door mounted thereon for movement between an open position and a closed position;

(d) at least one pair of clamping means for detachably attaching said front closure means to said flange portions of said side walls of said housing;

(e) each of said pair of clamping means including support means mounted on said rear surface of said flat member adjacent said door therein;

(f) a clamping member pivotally mounted on said support means for movement between a clamping position wherein said clamping member is in engagement with said flange portion of one of said side walls and an unclamping position wherein said clamping member is out of engagement with said flange portion;

(g) operating means rotatably supported on said support means for moving said clamping member between said clamping and unclamping positions;

(h) means mounted on said clamping member and connecting said clamping member to said operating means for translating the rotational movement of said operating means to a pivoting movement of said clamping member;

(i) said front closure means concealing said pair of clamping means from view when said front closure means is attached to said flange portions of said side walls of said housing; and (j) said door providing access to said pair of clamping members and their operating means only when said door is in said open position.

4. An electrical equipment enclosure as set forth in claim 3 wherein:

(a) said support means comprises a pair of spaced apart right angle brackets each having a leg portion extending rearwardly from the rear surface of said flat member;

(b) each said clamping member is mounted on said leg portion of one of said pair of right angle brackets; and (c) said operating means comprises a screw supported on said leg portion of the other of said pair of right angle brackets.

5. An electrical equipment enclosure comprising:

(a) a housing having a rear wall, a plurality of side walls, and an open front;

(b) at least some of said side walls each having an inwardly directed flange portion;

(c) front closure means for closing said open front wall of said housing comprising a trim panel having a door therein, said trim panel having a rear surface and a front surface;

(d) hinge means mounting said door on said trim panel for movement between an open position and a closed position;

(e) a plurality of clamping means for detachably attaching said trim panel to said flange portions of said side walls of said housing;

(f) each of said clamping means including a pair of right angle brackets mounted on said rear surface of said trim panel adjacent said door therein, said pair of brackets each having a leg portion extending rearwardly from the rear surface of said trim panel said leg portion of each of said pair of brackets being spaced apart and lying in planes which are perpendicular to each other;

(g) each of said clamping means also including a clamping member;

(h) pivoting means mounting said clamping member on said leg portion of one of said pair of right angle brackets for movement between a clamping position wherein said clamping member is in engagement with said flange portion of one of said side walls and an unclamping position wherein said clamping member is out of engagement with said flange portion;

(i) a screw member operatively connected to said clamping member for moving said clamping member between said clamping and unclamping positions;

(j) means supporting said screw member on said leg portion of the other of said pair of right angle brackets for rotation relative thereto;

(k) means mounted on said clamping member and connecting said clamping member to said screw member for translating the rotational movement of said screw member to a pivoting movement of said clamping member;

(l) said trim panel concealing said plurality of clamping means from view when said trim panel is attached to said flange portions of said side walls of said housing; and (m) said door providing access to said plurality of clamping means only when said door is in said open position.

6. An electrical equipment enclosure comprising:

(a) a housing having a rear wall, a plurality of side walls, and an open front;

(b) at least some of said side walls each having an inwardly directed flange portion;

(c) front closure means for closing said open front wall of said housing comprising a substantially flat member having a door therein, said flat member having a rear surface and a front surface;

(d) means mounting said door on said flat member for movement between an open position and a closed position;

(e) a tray shaped member supported within said housing in juxtaposed relation to said door in said flat member, said tray shaped member including wall portions having openings therein;

(f) at least one pair of clamping means for detachably attaching said front closure means to said flange portions of said side walls of said housing;

(g) each of said pair of clamping means including support means mounted on said rear surface of said flat member adjacent said door therein;

(h) a clamping member mounted on each of said support means for movement between a clamping position wherein said clamping member is in engagement with said flange portion of one of said side walls and an unclamping position wherein said clamping member is out of engagement with said flange portion;

(i) operating means supported on said support means for moving said clamping member between said clamping and unclamping positions;

(j) said front closure means concealing said pair of clamping means and their respective operating means from view when said front closure means is attached to said flange portions of said side walls of said housing;

(k) said door providing access to said pair of clamping means only when said door is in said open position; and (l) said operating means being accessible for operation through said openings in said wall portions of said tray shaped member.

7. An electrical equipment enclosure as set forth in claim 6 wherein:

(a) said support means comprises a pair of spaced apart right angle brackets each having a leg portion extending rearwardly from the rear surface of said flat member;

(b) said clamping member is mounted on said upstanding leg portion of one of said pair of right angle brackets; and (c) said operating means comprises a screw supported on said leg portion of the other of said pair of right angle brackets.

References Cited

UNITED STATES PATENTS

| | | | |
|---|---|---|---|
| 1,797,765 | 3/1931 | Frank | 292—256 |
| 2,036,044 | 3/1936 | Hammer | 317—119 |
| 2,946,928 | 7/1960 | Slade | 317—119 |

FOREIGN PATENTS

| | | |
|---|---|---|
| 1,051,961 | 9/1953 | France. |

JOSEPH R. LECLAIR, Primary Examiner

JAMES R. GARRETT, Assistant Examiner

U.S. Cl. X.R.

174—50; 220—55; 292—55; 317—119